United States Patent [19]

Bergendahl

[11] 4,439,384
[45] Mar. 27, 1984

[54] METHOD FOR MANUFACTURING GRAULES FROM POTASSIUM CHLORIDE FINES

[75] Inventor: Hans G. Bergendahl, Bochum-Weitmar, Fed. Rep. of Germany

[73] Assignee: Maschinenfabrick Koppern GmbH & Co. KG, Hattingen, Fed. Rep. of Germany

[21] Appl. No.: 331,355

[22] Filed: Dec. 16, 1981

[51] Int. Cl.³ .............................................. B01J 2/22
[52] U.S. Cl. ..................................... 264/37; 264/118
[58] Field of Search .................................. 264/118, 37

[56] References Cited

U.S. PATENT DOCUMENTS

| | | | |
|---|---|---|---|
| 3,150,416 | 9/1964 | Such | 264/118 |
| 3,793,841 | 2/1974 | Dozsa | 264/118 |
| 3,886,249 | 5/1975 | Manganaro | 264/118 |
| 4,165,978 | 8/1979 | Sanzenbach et al. | 264/118 |

*Primary Examiner*—James R. Hall
*Attorney, Agent, or Firm*—Salter & Michaelson

[57] ABSTRACT

A method for pressing salts in roll presses having one pair of rolls driven in synchronism, the roll surfaces being profiled, in particular ridged or honeycombed, where the salt is fed into the nip between the rolls by filling screws. The method includes a. feeding the material to the press at a temperature above 120° C. in the nip of the rolls,
b. pressing carried out with a specific press force at least equal to 4.5 t/cm,
c. the circumferential velocity of the rolls being between 0.55 and 0.75 m/sec,
d. the surface of the rolls being maintained at a temperature below 80° C.

5 Claims, 8 Drawing Figures

METHOD FOR MANUFACTURING GRAULES FROM POTASSIUM CHLORIDE FINES

The invention relates to a method for pressing salts in roll presses having one pair of rolls driven in synchronism, the roll surfaces being profiled, in particular ridged or honeycombed, where the salt is fed into the nip between the rolls by filling screws.

Potassium salts (potassium chloride) used as fertilizers are leaving the crystallization stage during manufacture as material of relatively small particle size which in a high percentage is unsuitable, in this form, for mechanical spreading. These salts for use as fertilizers are therefore usually pressed in roll presses so as to produce granules with particle size of, for example, between 1 and 4 mm. A certain method for manufacturing those granules is described in U.S. Pat. No. 3,135,473 by Schrader et al.

When the salts are pressed by means of rolls having profiled surfaces a good pick-up of the salt and thus a good filling of the roll surface is achieved. Rolls of this type, like the more generally used smooth-surface rolls, have hitherto been driven in such a way as to produce sheets which do not exceed thickness of approximately 8 to 10 mm. Hitherto attempts to increase the throughput have been implemented by increasing the circumferential velocity of the rolls. However, limits to the increase in circumferential velocity arise from the fact that above certain circumferential velocities it is no longer possible to achieve satisfactory pressing of the sheet.

A criterion for the quality of granules of salts used as fertilizer is the so-called abrasive resistance. This is defined as the amount of salt which is abraded from the granules during shaking of the granules with steel spheres within a predetermined time. The lower the amount of salt abraded the better is the quality.

It is an object of the invention to devise a method by means of which it is possible to produce, with high throughput, sheets of particularly high strength from which a granulate with high abrasive resistance can be manufactured.

A method for manufacturing granules from potassium chloride fines comprises:

a. feeding potassium chloride fines by means of filling screws to a roll press having one pair of rolls arranged side by side with parallel rotational axis in a roller frame, one of said rolls being rotatable about a substantially stationary axis and the other roll being laterally displacable against a hydraulic roller setting system, said filling screws being mounted on said roller frame for feeding into the nip of the two rolls, said fines having a temperature of at least 120° C. when entering said nip, said rolls having profiled surfaces, being internally cooled, to operate with a temperature of its surfaces of less than 80° C., being driven with a circumferential velocity of between 0.55 and 0.75 meter per second, and having a specific press force therebetween of at least 4.5 metric tons per linear centimeter of roll length, and said profile on said profiled surfaces and the distance between said surfaces being chosen to form said fines into a sheet of compacted potassium chloride having a thickness of at least 10 mm;

b. feeding said sheet to a granulator to form granules;

c. sieving said granules to separate therefrom granules of greater and less than a desired size;

d. recycling said granules of greater than said desired size to said granulator;

e. recycling said granules of less than said desired size to said roll press.

By means of the method according to the invention a granulate is produced which has an abrasive resistance which is considerably greater than the abrasive resistance of salts pressed by known methods. The abrasive resistance is improved by a magnitude of 30–50%.

The enclosed drawings show in detail:

Figure 1:
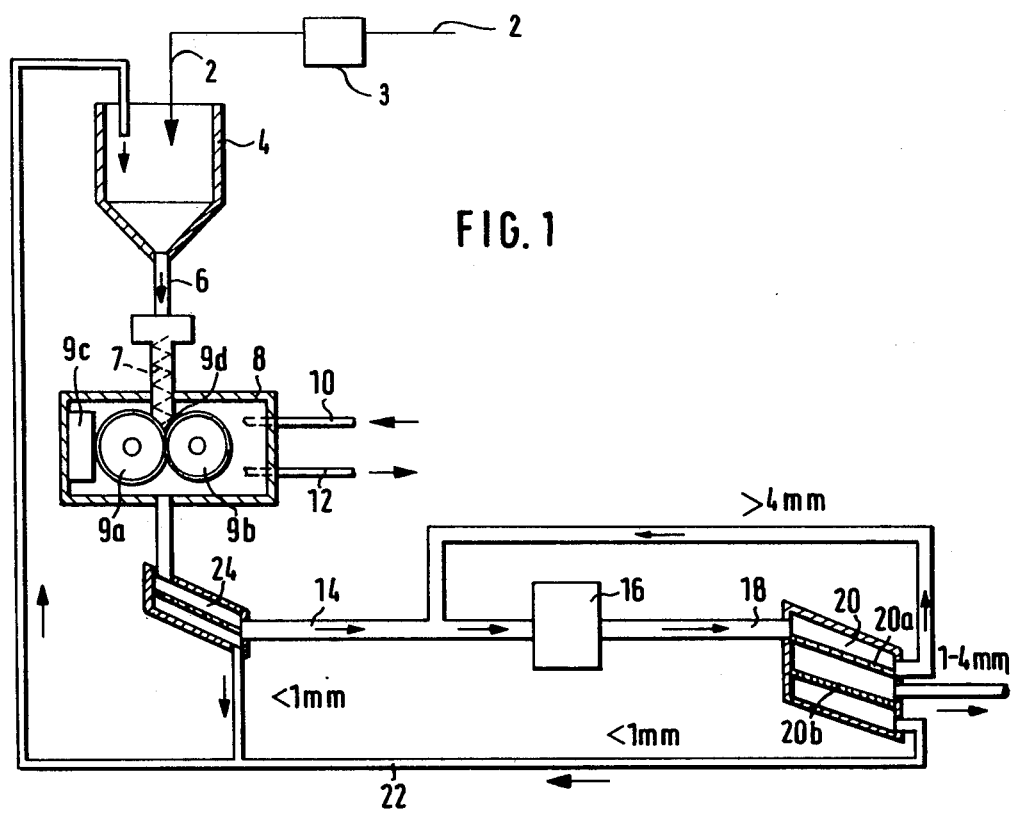
FIG. 1 is a flow diagram.

By way of further example, the method according to the invention is illustrated in the accompanying flow diagram shown in FIG. 1. The salt, for example potassium salt fines with a particle size less than 0.2 to 0.3 mm, is, as shown by the arrow 2, led from a dryer 3 to a hopper 4 from which it is fed through a conduit 6 to a roll press 8 provided with two rolls 9a, 9b rotating in opposite directions about parallel horizontal axes in the press frame. One roll 9b is rotatable about a substantially stationary axis and the other roll 9a is laterally displacable against a hydraulic setting system 9c. The material is fed into the nip 9d between the rolls 9a, 9b by means of a filling screw 7, and in particular by means of a multiplicity of filling screws arranged side by side in the axial direction of the rolls. The rolls are profiled on their surfaces, in particular ridged or honeycombed. The rolls are cooled and for this purpose the roll press 8 is provided with an inlet 10 and an outlet 12 for cooling water.

The sheet produced in the roll press 8 is conveyed to a granulator 16 by means of a conveyor device 14. The granulated material at 18 is conveyed to a three fraction sieving device 20 which includes a sieve 20a on which material of large particle size, e.g. greater than 4 mm is removed. This material is returned to the material flow before the granulator 16.

The fines, with particle size less than 1 mm, pass through a sieve 20b which is also included in the sieving device 20 and are returned to the hopper 4 by means of the conveyor device 22.

The material with particle size from 1 to 4 mm leaving the sieve is the usable material.

The material leaving the roll press includes a certain amount of unpressed fines. Material with a particle size less than 1 mm may be sieved off in a sieving device 24 upstream of the granulator 16. These fines are returned, together with the fines sieved off in the sieving device 20, to the hopper 4 by means of the conveyor device 22.

Figure 2:
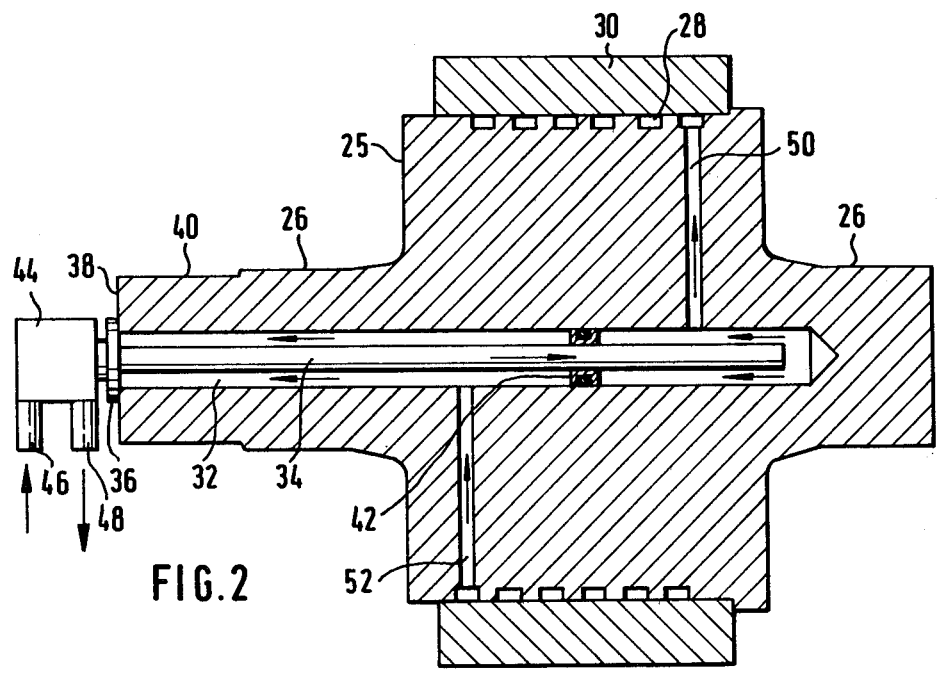
FIG. 2 is a longitudinal section through a roll with cooling means as used in a roll press schematically shown in FIG. 1.

FIG. 2 shows the longitudinal section of a roll as used for a roll press according to FIG. 1. The roll body 25 is provided with axial projections 26, with which the roll body is pivotably mounted as known per se, e.g. on ball bearings provided in an outer bearing housing. In the upper surface of the roll body 25 is located a spiral cooling channel 28 closed at the outside by a roll shell 30, which is profiled on its surface as to be described in the following with reference to FIGS. 3 to 7.

The roll body 25 has an axial bore 32, which is formed as a blind bore and into which is introduced a tube 34, which e.g. is connected to the front face 38 of an extension 40 of the pin 26 via a flange 36. The space between the tube 34 and the wall of the bore 32 is closed by a seal 42 about in the middle of the roll body.

At the outside of the end of the tube 34 a stationary connection head 33 is pivotably mounted having an inlet 46 and an outlet 48 for the cooling medium. In the bore 32 at both sides of the seal 42 radial passages 50, 52 are directed to the two ends of the spiral cooling channel 28. The water supplied to the connection 46 reaches the end of the blind bore via the tube 34 and from there via the radial passage 50 one end of the cooling channel 28. At the other end of said cooling channel the cooling medium reaches the annular chamber formed between the wall of the bore 32 and the tube 34 via the radial passage 52. There the water enters the duct 48 within the connection head 44 and is then discharged via said duct.

The supply and discharge of cooling medium as described in the foregoing is known in the art and e.g. shown in the U.S. Pat. Nos. 4,019,846 and 4,123,971.

Figure 3:
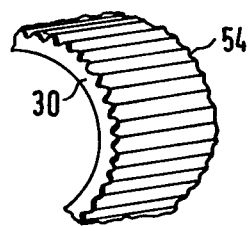
FIG. 3 is a perspective view of a roll shell, the surface of which is profiled by ridges arranged in parallel relation to the roll axis.
Figure 4:
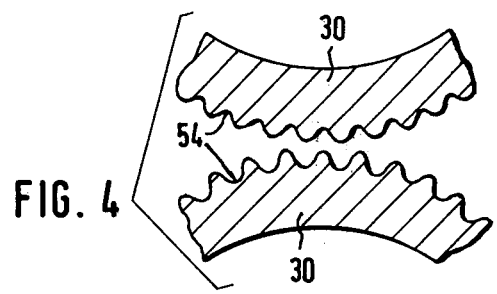
FIG. 4 is a section showing how the ridged surfaces of the two rolls placed side by side are cooperating.

In FIG. 3 is shown the perspective view of a roll shell 30 having axis parallel recesses 54 on its outer surface. As to be noted from FIG. 4 these recesses are wavelike in cross-section. The rolls are adjusted in such relation to each other that projections on one roll shell are opposed to recesses on the other roll shell each time. Roll shells formed in this way are e.g. known from U.S. Pat. Nos. 2,675,304 and 3,390,968.

FIG. 5 again shows the perspective view of a roll shell 30 having honeycombed recesses 56 on its outer surface, the individual recesses of the adjacent rows I, II, III being staggered or offset each preferably by half a spacing in circumferential direction, so that the transverse webs of the rows I and III are again in alignment in axial direction. But there is also possible any other displacement. As to be noted from FIG. 6, the recesses 56 are relatively shallow. On the opposed rolls they are staggered in that way that the lowest point of a recess on one roll is each time opposed to a web on the other roll. As to be gathered from FIG. 7, on the roll shells 30 opposed to each other moreover the individual rows I, II, III and so on are staggered by a half spacing even in axial direction. A respective honeycombed design is a preferred embodiment. The size of the recesses is preferably in the magnitude of 40×40 mm, the depth of the recesses being about 4 to 5 mm.

It was found that, in spite of the relatively low circumferential velocity, a high throughput can be achieved and, in particular, it is possible in the method according to the invention to increase the thickness of the sheet considerably. Sheet thicknesses greater than 14 mm can easily be achieved by the method according to the invention. Sheet thicknesses of 16 mm have been achieved with a similar abrasive resistance of the granules. When the thickness of the sheet is increased it is necessary to adjust the specific press force. For example, the sheet thickness of 16 mm was achieved for potassium chloride fines by means of a specific press force of about 5.5 t/cm. A considerable improvement in the circulation ratio of feed material to compacted sheet is also achieved in the method according to the invention. For example, a ratio of compacted sheet to feed material greater than 90% was achieved, that is at least 90% of the feed of small particle size was pressed to form sheets capable of being granulated.

The sheet was then granulated by using an impact granulator mill. The granules were then separated into three fractions by sieving. The granules within a predetermined particle size range, for example 1–4 mm, were removed as granules of usable size. Granules with particle sizes less than 1 mm—undersize—were returned to the hopper feeding for the press and pressed again. Granules with particle sizes greater than 3 mm were returned to the granulator.

A ratio of undersize to usable granules of about 1:1 is achieved in the method according to the invention. The circulation amount is thus reduced to about half the total flow of material. In known smooth roll presses the material circulated is greater than 300% of the usable granules produced.

Thus a decrease in the specific electric power consumption is achieved by comparison with presses with rolls having smooth surfaces. Calculated on the total plant, it is possible to count on a 50% cut in the specific electrical power consumption, that is in the amount of electrical power consumed for unit weight of usable material.

Owing to the relatively low circumferential velocity together with the profiling of the roll surfaces a particularly favourable de-aeration of the material is also achieved so that it is possible to produce sheets substantially free from interruptions.

Because of the temperature of the roll surfaces, which is below 80° C., in particular within the range 40° C. to 70° C., melting of the salt on the surfaces of the rolls is avoided. The sheet has a hard polished surface. The surface temperatures which it is possible to achieve on the rolls depend essentially on the temperature of the cooling water available and on the temperature of the surroundings. Attempts should be made to secure as low a temperature as possible, preferably within the range from 40° to 60° C.

A typical method was carried out with the following data:
1. A roll press with two rolls arranged horizontally with its axis of rotation being parallel.
   1.1 Roll diameter 1000 mm.
   1.2 Working breadth of the rolls 1250 mm.
   1.3 Surface honeycombed with cushion-type depressions with
      1.3.1 maximum depth 5 mm.
      1.3.2 sides 40 mm.
      1.3.3 lateral offset of the honeycombed depressions on the surfaces of the rolls 50%.
      1.3.4 offset of the honeycombed depressions in the circumferential direction on the surfaces of the two rolls 50%.
   1.4 Cooling of the rolls by means of cooling medium flowing through channels arranged below the surface of the rolls.
   1.5 Drive
      1.5.1 installed operating power 630 KW 1.5.2 rotation of the rolls 12 per minute, corresponding to a circumferential velocity of 0.6 m/sec 1.5.3 synchronised drive of the two rolls 1.6 Feed by means of five filling screws.

2. Feed material potassium chloride fines with more than 96% KCL.

2.1 Particle size less than 1 mm 2.2 salt temperature 140° C.

3. Operation 3.1 mean thickness of sheet 14 mm.

3.2 specific press force 4.5 t/cm 3.3 throughput 3.3.1 gross 80 t/h 3.3.2 sheet production 75 t/h 3.3.3 yield of granules particle size 1–4 mm 45 t/h 3.3.4 abrasive resistance-high.

3.4 Power consumption of the press 425 KW.

4. When the mean thickness of the sheet is increased to 16 mm, with a proportional increase in power consumption, a proportional increase in the throughput data stated under 3.3 is achieved with the same granule quality.

Figure 5:
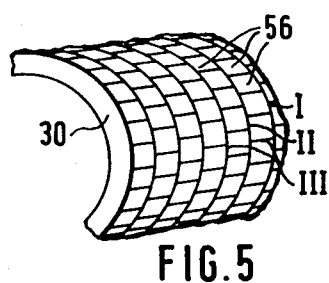
FIG. 5 shows a roll shell similar to FIG. 3, having honeycombed recesses on its surface.
Figure 6:
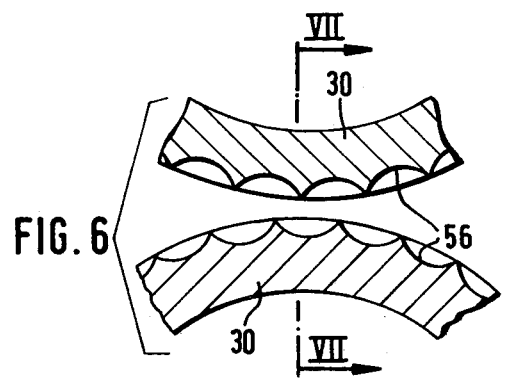
FIG. 6 is a cross-section through the shells of the cooperating rolls having a profiled surface according to FIG. 5.
Figure 7:
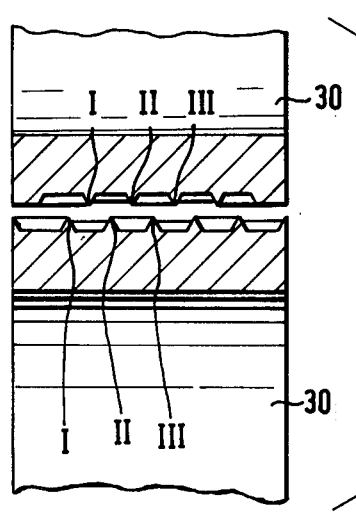
FIG. 7 is a section along the line VII—VII in FIG. 6.
Figure 8:
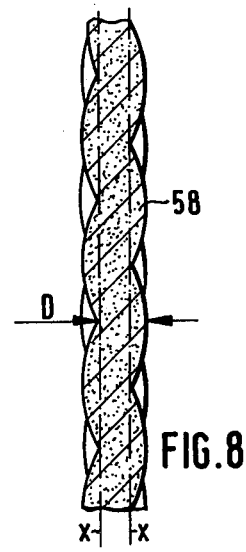
FIG. 8 is a section through a sheet of compacted material.

FIG. 8 shows a longitudinal section through a sheet as produced in case of the method with the above data, i.e. by using rollers having surfaces profiled according to FIGS. 5 to 7. The shape of the sheets results from the distance of the rolls in the presses, which can be determined by an intermediate element between the two bearing housings (not shown) of the two rollers and the outlines of the depressions 56 in the roller surfaces. Thus the sheet consists of a middle section between the dash-dotted lines x, the distance of which corresponds to the adjusted distance of the rollers, and the shallow domes on both sides of the middle sections corresponding to the depressions. Thus the sheet has an undulated shape. The thickness D of the sheet may be kept mainly continuous over the length and width of the sheet by choosing the outlines of the depression. In case of square or mainly square shape of the depressions and 50% offset in longitudinal and circumferential direction of the rolls, a section taken transversely to the longitudinal direction of the sheet corresponds to the longitudinal section according to FIG. 8. In case of such sheet the thickness D is mainly equal at all points of the sheet.

What I claim as my invention and desire to secure by Letters Patent of the United States is:

1. A method of manufacturing granules from potassium chloride fines comprising:

a. feeding potassium chloride fines by means of filling screws to a roll press having a pair of rolls arranged side by side with parallel rotational axes in a roller frame, one of said rolls being rotatable about a substantially stationary axis and the other roll being laterally displaceable against a hydraulic roller setting system, said filling screws being mounted on said roller frame for feeding into the nip of the two rolls, said fines having a temperature of at least 120° C. when entering said nip, said rolls having profiled surfaces with honeycomb-like depressions therein, the depressions on the opposite rolls being laterally and circumferentially offset by approximately 50% relative to each other, said rolls being internally cooled to operate with surface temperatures of less than 80° C., being driven with circumferential velocities of between 0.55 and 0.75 meters per second, and having specific press forces therebetween of at least 4.5 metric tons per linear centimeter of roll length, and said profile on said profiled surfaces and the distance between said surfaces being chosen to form said fines into a sheet of compacted potassium chloride having a thickness of at least 10 mm;

b. feeding said sheet to a granulator to form granules;

c. sieving said granules to separate therefrom granules of greater than approximately 4 mm and less than approximately 1 mm in dimension;

d. recycling said granules of greater than approximately 4 mm in dimension to said granulator;

e. recycling said granules of less than approximately 1 mm in dimension to said roll press.

2. The method according to claim 1 in which the rolls are driven with a circumferential velocity of between 0.6 and 0.7 m/sec.

3. The method according to claim 1 in which the fines are fed into the nip of the rolls at a temperature between 130° C. and 160° C.

4. The method according to claim 1, in which the surfaces of the rolls are cooled to operate at a temperature between 40° C. and 70° C.

5. The method according to claim 4 in which the surface of the rolls are cooled to operate at a temperature between 40° C. and 60° C.

* * * * *